US009122935B2

(12) United States Patent
Nomoto (10) Patent No.: US 9,122,935 B2
(45) Date of Patent: Sep. 1, 2015

(54) OBJECT DETECTION METHOD, STORAGE MEDIUM, INTEGRATED CIRCUIT, AND OBJECT DETECTION APPARATUS

(71) Applicant: MegaChips Corporation, Osaka-shi (JP)

(72) Inventor: Shohei Nomoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/166,070

(22) Filed: Jan. 28, 2014

(65) Prior Publication Data
US 2014/0247987 A1 Sep. 4, 2014

(30) Foreign Application Priority Data

Mar. 4, 2013 (JP) ................................ 2013-042003

(51) Int. Cl.
G06K 9/00 (2006.01)
G06K 9/62 (2006.01)
G06K 9/32 (2006.01)
G06T 7/60 (2006.01)

(52) U.S. Cl.
CPC ........ *G06K 9/00805* (2013.01); *G06K 9/00825* (2013.01); *G06K 9/3241* (2013.01); *G06K 9/6201* (2013.01); *G06K 9/6202* (2013.01); *G06T 7/608* (2013.01)

(58) Field of Classification Search
CPC .......... G06K 9/00805; G06K 9/00785; G06K 9/00791; G06K 9/62; G06K 9/6202; G06K 9/00825; G06K 9/3241; G06K 9/6201; G01D 1/0246; G06T 7/608
See application file for complete search history.

(56) References Cited

U.S. PATENT DOCUMENTS 6,570,998 B1 * 5/2003 Ohtsuka et al. ............... 382/104
6,658,150 B2 * 12/2003 Tsuji et al. .................... 382/218
6,842,531 B2 * 1/2005 Ohtsuka et al. ............... 382/104

(Continued)

FOREIGN PATENT DOCUMENTS

JP 10-11582 1/1998
JP 2007-26400 2/2007

*Primary Examiner* — Manav Seth
(74) *Attorney, Agent, or Firm* — Oblon, McClelland, Maier & Neustadt, L.L.P.

(57) ABSTRACT

It is an object of the present invention to achieve an object detection apparatus, a program, and an integrated circuit each of which is capable of appropriately detecting an axially symmetric object in an image, whatever image is to be processed, without performing any complicated thresholding. The object detection apparatus includes a processing object region determination unit, a variance acquisition unit, a matching determination unit, and an object region detection unit. The processing object region determination unit sets a symmetry axis in an image region included in an image and divides the image region into a determination image region and a reference image region so as to be line symmetric with respect to the symmetry axis. The variance acquisition unit acquires a degree of variance of image feature amount in the image region. The matching determination unit acquires a matching value between the determination image region and the reference image region and determines the symmetry between the determination image region and the reference image region with respect to the symmetry axis on the basis of a corrected matching value which is obtained by correcting the acquired matching value in accordance with the degree of variance. The object region detection unit detects an image region which is line symmetric with respect to the symmetry axis on the basis of a determination result from the matching determination unit.

12 Claims, 7 Drawing Sheets

(56) References Cited

U.S. PATENT DOCUMENTS

| | | | |
|---|---|---|---|
| 7,587,064 B2* | 9/2009 | Owechko et al. | 382/103 |
| 7,664,608 B2* | 2/2010 | Urano et al. | 702/40 |
| 8,265,351 B2* | 9/2012 | Aarabi | 382/118 |
| 8,768,007 B2* | 7/2014 | Schamp | 382/103 |
| 2001/0002936 A1* | 6/2001 | Tsuji et al. | 382/170 |
| 2013/0229525 A1* | 9/2013 | Nagaoka et al. | 348/148 |
| 2013/0251193 A1* | 9/2013 | Schamp | 382/103 |

* cited by examiner

|  | REGION R1 | REGION R2 | REGION R3 |
|---|---|---|---|
| MATCHING VALUE M1 | 293434 | 308643 | 383380 |
| VARIANCE VALUE Var OF LUMINANCE VALUE | 4183.59 | 5173.95 | 1707.72 |
| CORRECTED MATCHING VALUE M2 | 70.139 | 59.653 | 224.499 |
| NORMALIZED VALUE (M1) | 1.00 | 1.05 | 1.31 |
| NORMALIZED VALUE (M2) | 1.00 | 0.85 | 3.20 |

OBJECT DETECTION METHOD, STORAGE MEDIUM, INTEGRATED CIRCUIT, AND OBJECT DETECTION APPARATUS

BACKGROUND OF THE INVENTION

1. Field of the Invention

The present invention relates to an image processing technique, and more particularly to a technique for detecting an object in an image.

2. Description of the Background Art

Many techniques for detecting an object in an image by pattern matching are proposed. Japanese Patent Application Laid Open Gazette No. 2007-26400 (Patent Document 1), for example, discloses a technique in which pattern matching is performed by using an image region (image to be checked) included in a captured image and an image pattern (template image (reference image)) which is stored in advance, to thereby extract a recognition object from the captured image on the basis of the result of pattern matching.

In the case where a recognition object (predetermined object) is extracted from an image by performing pattern matching, like in the technique of Patent Document 1, usually, it is determined whether or not it is an image (image region) including the recognition object by comparing a matching value calculated through the pattern matching with a predetermined threshold value.

When the pattern matching is performed on the image (image region) including the recognition object is uneven, such as images with different contrasts or images with different distributions of image feature amounts (for example, luminance distributions), the matching value calculated thereby significantly varies. This makes it difficult to specify (extract) a region including the recognition object by using the matching value. In such a case, in order to appropriately perform the pattern matching, it is necessary to prepare a plurality of template images (reference images) for each image characteristic, and further prepare a plurality of threshold values to be compared with the matching values for the plurality of template images.

Meanwhile, there is a technique for specifying (extracting) a bilaterally symmetrical object in an image by using the pattern matching. In such a technique, an image region to be processed is divided by the symmetry axis into one divided image region to be defined as a determination image region and the other divided image region to be defined as a reference image region (template image region), and the pattern matching is performed on the determination image region and the reference image region. Then, by comparing a matching value obtained by the pattern matching with a predetermined threshold value, it is determined whether or not the image region to be processed is a region including a bilaterally symmetrical object.

The above technique does not require to prepare a plurality of reference images. However, if the above technique is applied to images in which image regions to be processed are uneven (for example, image regions with different contrasts or with different distributions of image feature amounts (e.g., luminance distributions)), the matching value obtained through the pattern matching significantly varies. Therefore, it is necessary to perform a complicated thresholding (for example, processing using a plurality of threshold values with grouping in accordance with cases for each image characteristic, or the like).

To solve the above problems, it is an object of the present invention to provide an object detection apparatus, a program, and an integrated circuit each of which is capable of appropriately detecting an axially symmetric object in an image, whatever image is to be processed, without performing any complicated thresholding.

SUMMARY OF THE INVENTION

In order to solve the above problem, a first aspect of the present invention provides an object detection apparatus including a processing object region determination unit, a variance acquisition unit, a matching determination unit, and an object region detection unit.

The processing object region determination unit sets a symmetry axis in an image region included in an image and divides the image region into a determination image region and a reference image region so as to be line symmetric with respect to the symmetry axis.

The variance acquisition unit acquires a degree of variance of image feature amount in the image region.

The matching determination unit acquires a matching value between the determination image region and the reference image region and determines the symmetry between the determination image region and the reference image region with respect to the symmetry axis on the basis of a corrected matching value obtained by correcting the acquired matching value in accordance with the degree of variance The object region detection unit detects an image region which is line symmetric with respect to the symmetry axis on the basis of a determination result obtained by the matching determination unit.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Embodiment

Hereinafter, with reference to figures, the first embodiment will be discussed.

<1.1: Constitution of Object Detection System>

Figure 1:
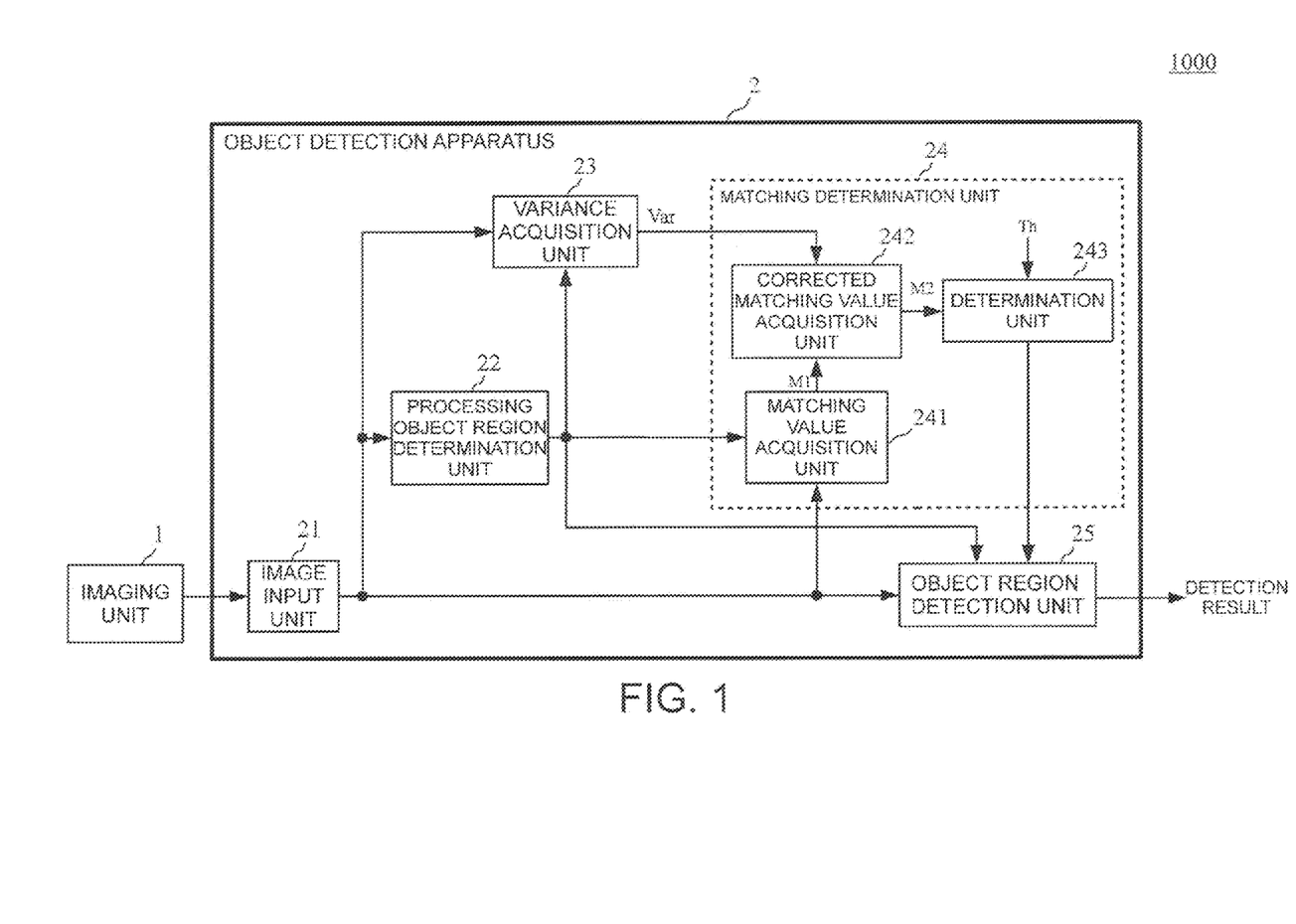
FIG. 1 is a block diagram showing an overall constitution of an object detection system 1000 in accordance with a first embodiment.

FIG. 1 is a block diagram showing an overall constitution of an object detection system 1000 in accordance with the first embodiment of the present invention.

As shown in FIG. 1, the object detection system 1000 includes an imaging unit 1 and an object detection apparatus 2.

The imaging unit 1 includes an optical system (not shown) for condensing light from a subject and an image sensor (for example, a CCD image sensor or a CMOS image sensor) (not shown) for acquiring subject light condensed by the optical system as an image signal (electrical signal) obtained through photoelectric conversion of the subject light. The imaging unit 1 outputs an image (image signal) captured by the image sensor to the object detection apparatus 2.

As shown in FIG. 1, the object detection apparatus 2 includes an image input unit 21, a processing object region determination unit 22, a variance acquisition unit 23, a matching determination unit 24, and an object region detection unit 25.

The image input unit 21 receives the image (image signal) outputted from the imaging unit 1. In a case where the imaging unit 1 is an imaging device using a CCD image sensor having a color filter of RGB Bayer array, for example, the image input unit 21 receives, for example, an image signal array including an R component signal, a G component signal, and a B component signal. The image input unit 21 converts the inputted image signal into a predetermined format as necessary and outputs a converted image signal (an unconverted image signal when the image signal is not converted) to the processing object region determination unit 22, the variance acquisition unit 23, the matching determination unit 24, and the object region detection unit 25.

The "conversion into a predetermined format" refers to, for example, conversion of color space (for example, conversion from the RGB color space into the YCbCr color space). The image input unit 21 converts the inputted image signal of the RGB color space (the R component signal, the G component signal, and the B component signal) into a signal of the YCbCr color space (a Y component signal, a Cb component signal, and a Cr component signal) as necessary.

Hereinafter, for convenience of discussion, an exemplary case will be discussed, where the image input unit 21 converts the inputted image signal of the RGB color space (the R component signal, the G component signal, and the B component signal) into a signal of the YCbCr color space (the Y component signal, the Cb component signal, and the Cr component signal) and outputs only the Y component signal (luminance signal (luminance image)) to the processing object region determination unit 22, the variance acquisition unit 23, the matching determination unit 24, and the object region detection unit 25.

The processing object region determination unit 22 receives the luminance image outputted from the image input unit 21. The processing object region determination unit 22 determines an image region (processing object region) on which the symmetry is to be determined and a symmetry axis in the inputted luminance image. Then, the processing object region determination unit 22 outputs information on the determined processing object region and symmetry axis to the variance acquisition unit 23, the matching determination unit 24, and the object region detection unit 25.

The variance acquisition unit 23 receives the luminance image outputted from the image input unit 21 and the information on the processing object region and the symmetry axis outputted from the processing object region determination unit 22. The variance acquisition unit 23 acquires a degree of variance of image feature amount (e.g., luminance value) in the entire processing object region or a degree of variance of image feature amount (e.g., luminance value) in one image region obtained through dividing the processing object region by the symmetry axis. Then, the variance acquisition unit 23 outputs information on the acquired degree of variance to the matching determination unit 24.

As shown in FIG. 1, the matching determination unit 24 includes a matching value acquisition unit 241, a corrected matching value acquisition unit 242, and a determination unit 243.

The matching value acquisition unit 241 receives the luminance image outputted from the image input unit 21 and the information on the processing object region and the symmetry axis outputted from the processing object region determination unit 22. The matching value acquisition unit 241 acquires a matching value (the detail thereof will be described later) between one image region (hereinafter, referred to as a "determination image region") obtained through dividing the processing object region by the symmetry axis and the other image region (hereinafter, referred to as a "reference image region") obtained also through dividing the processing object region by the symmetry axis. Then, the matching value acquisition unit 241 outputs information on the acquired matching value to the corrected matching value acquisition unit 242.

The corrected matching value acquisition unit 242 receives the information on the degree of variance outputted from the variance acquisition unit 23 and the information on the matching value outputted from the matching value acquisition unit 241. The corrected matching value acquisition unit 242 corrects the matching value on the basis of the degree of variance and outputs information on the corrected matching value to the determination unit 243.

The determination unit 243 receives the corrected matching value outputted from the corrected matching value acquisition unit 242. The determination unit 243 compares the corrected matching value with a threshold value Th to determine the symmetry of the processing object region. Then, the determination unit 243 outputs the determination result to the object region detection unit 25.

The object region detection unit 25 receives the luminance image outputted from the image input unit 21, the information on the processing object region and the symmetry axis outputted from the processing object region determination unit 22, and the determination result outputted from the determination unit 243. The object region detection unit 25 determines whether or not the processing object region is an image region having high symmetry with respect to the symmetry axis on the basis of the determination result from the determination unit 243, and outputs the determination result.

<1.2: Operation of Object Detection System>

Hereinafter, discussion will be made on an operation of the object detection system 1000 having the above constitution.

An exemplary case where the imaging unit 1 captures an image shown in FIG. 2 and the object detection apparatus 2 receives the image will be discussed below.

Figure 2:
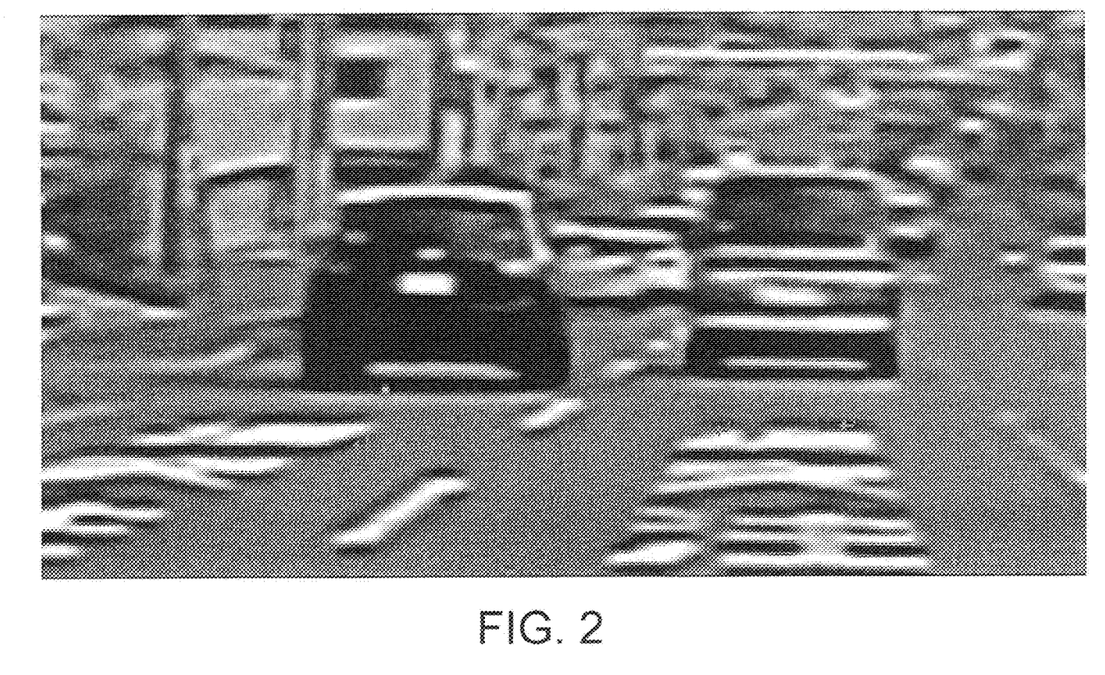
FIG. 2 is a view showing (an example of) an input image of the object detection system 1000 in accordance with the first embodiment.

The image shown in FIG. 2 is inputted to the image input unit 21. Since the image inputted to the image input unit 21 is a luminance image, the image input unit 21 does not perform conversion or the like (conversion of color space or the like), and the inputted image, being unchanged, is outputted from the image input unit 21 to the processing object region determination unit 22, the variance acquisition unit 23, the matching value acquisition unit 241, and the object region detection unit 25.

The processing object region determination unit 22 determines an image region (processing object region) on which the symmetry is to be determined and a symmetry axis in the inputted image.

The processing object region determination unit 22 automatically or manually determines an image region (processing object region) on which the symmetry is to be determined.

In a case where the processing object region determination unit 22 automatically determines the processing object region, for example, the processing object region determination unit 22 sets a trace frame having a predetermined size and sets a region of the inputted image within the trace frame as the processing object region. Then, the processing object region determination unit 22 sequentially sets processing object regions while shifting the trace frame on the inputted image in a predetermined direction, so as to repeat the processing in the object detection system 1000. The size (area) of the trace frame may be constant or variable.

In a case where the processing object region determination unit 22 manually determines the processing object region, for example, the processing object region determination unit 22 determines an image region which is set by a user, as a processing object region.

Figure 3:
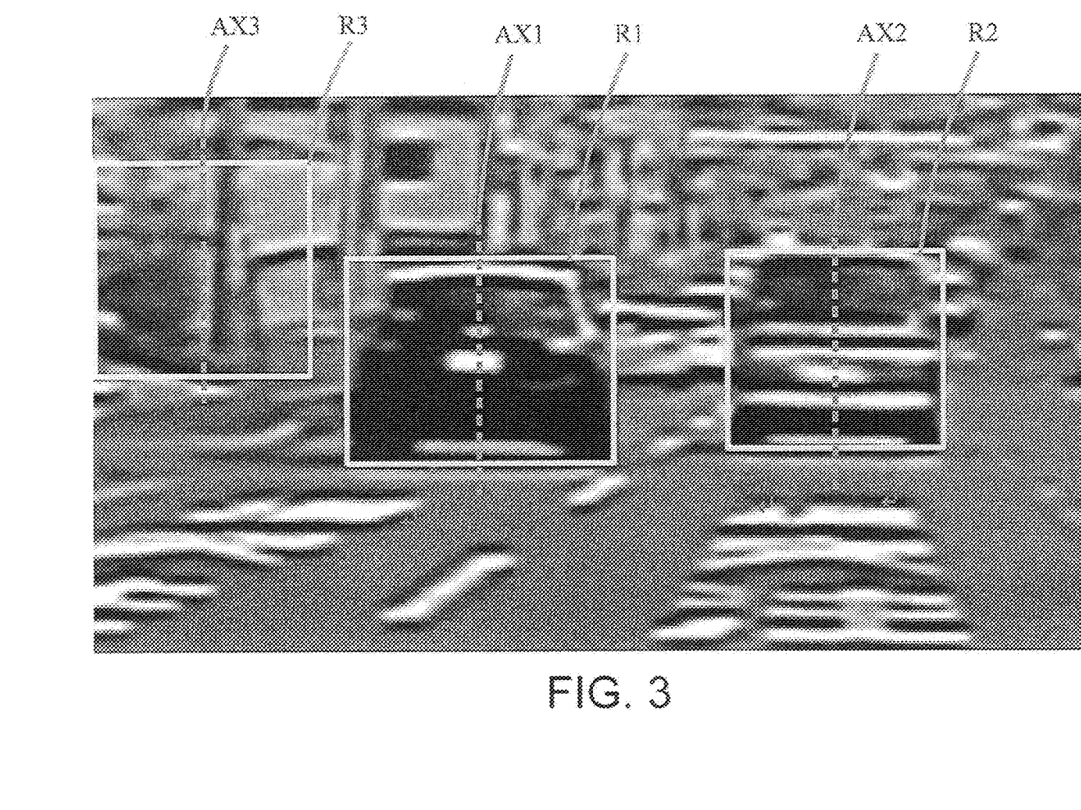
FIG. 3 is a view showing an image in which processing object regions are specified in the input image of the object detection system 1000 in accordance with the first embodiment.

Hereinafter, for convenience of discussion, an exemplary case will be discussed, where three regions R1, R2, and R3 shown in FIG. 3 are set as the processing object regions and an object (image region) having high bilateral symmetry (symmetry in a horizontal direction) is to be detected.

The processing object region determination unit 22 determines symmetry axes to be used for determining the symmetry in the processing object regions. In order to detect an object having high symmetry in the horizontal direction of the image, as shown in FIG. 3, symmetry axes AX1 to AX3 are determined as the symmetry axes for determination of the symmetry in the processing object regions R1 to R3, respectively. In other words, the processing object region determination unit 22 sets (determines) the symmetry axis such that the processing object region is equally divided into the left and right portions (in the horizontal direction). Accordingly, as shown in FIG. 3, the symmetry axis is a vertical straight line which passes a center point of the processing object region.

The information on the processing object regions and the symmetry axes determined (set) by the processing object region determination unit 22 is outputted to the variance acquisition unit 23, the matching determination unit 24, and the object region detection unit 25.

The variance acquisition unit 23 acquires a degree of variance Var in the processing object region. The variance acquisition unit 23 obtains the degree of variance Var, for example, through the following process.

(1) The variance acquisition unit 23 calculates a variance value of the pixel values (luminance values) of pixels included in the processing object region and determines the calculated variance value as the degree of variance Var.

(2) The variance acquisition unit 23 calculates a variance value of the pixel values (luminance values) of pixels included in one image region obtained through dividing the processing object region by the symmetry axis, i.e., the determination image region or the reference image region, and determines the calculated variance value as the degree of variance Var.

The information on the degree of variance Var acquired by the variance acquisition unit 23 through the above process is outputted to the corrected matching value acquisition unit 242.

The matching value acquisition unit 241 acquires a matching value M1 between the determination image region which is one image region obtained through dividing the processing object region by the symmetry axis and the reference image region which is the other image region obtained through dividing the processing object region by the symmetry axis. This process will be discussed with reference to FIG. 4.

Figure 4:
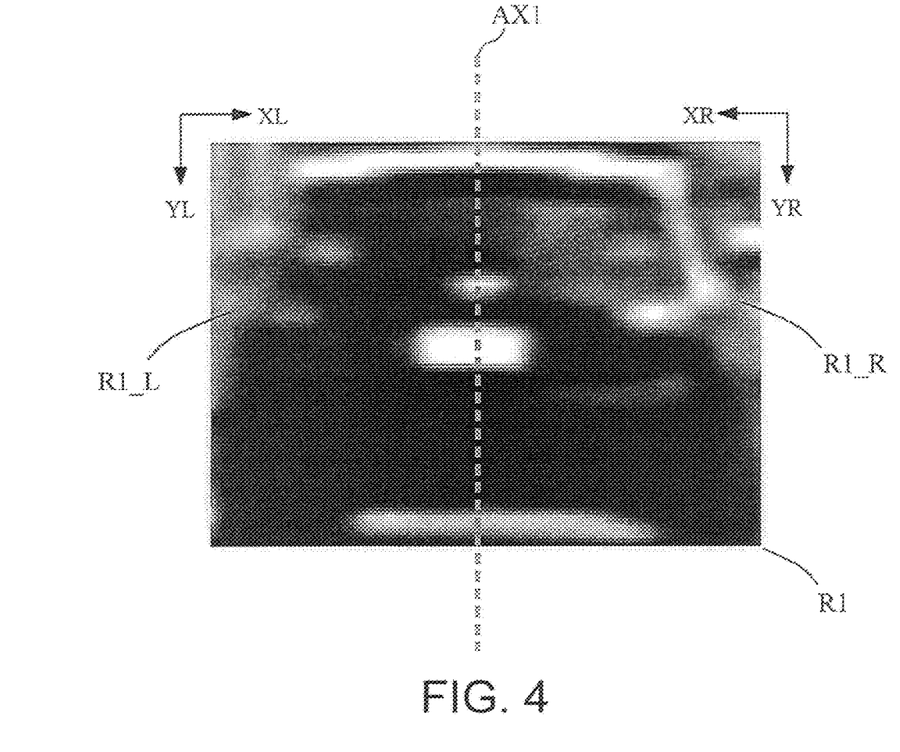
FIG. 4 is a view showing a processing object region R1 which is extracted.

FIG. 4 is a view showing only the processing object region R1 included in FIG. 3. An image region R1_L shown in FIG. 4 is the determination image region which is one image region obtained through dividing the processing object region R1 by the symmetry axis AX1 and an image region R1_R is the reference image region which is the other image region obtained through dividing the processing object region R1 by the symmetry axis AX1.

Further, in order to determine the symmetry in the left and right direction (horizontal direction), as shown in FIG. 4, coordinate axes are set. Specifically, the coordinate axes (X axis: XL, Y axis: YL) for the determination image region R1_L and the coordinate axes (X axis: XR, Y axis: YR) for the reference image region R1_R are set in a manner that these axes are the same in the Y-axis direction but opposite in the X-axis direction. In the coordinate axes of the determination image region R1_L, the origin is the upper-left endpoint, whereas in the coordinate axes of the reference image region R1_R, the origin is the upper-right endpoint. Further, the determination image region R1_L and the reference image region R1_R are image regions each consisting of n pixels×m pixels (m, n: natural number).

The matching value acquisition unit 241 calculates a differential absolute value between the pixel values of the pixels located at line symmetric positions with respect to the symmetry axis and integrates the differential absolute values for all the pixels included in the determination image region and the reference image region, to thereby obtain the matching value M1. Specifically, the matching value acquisition unit 241 performs an operation of Eq. 1, to thereby obtain the matching value M1:

$$M1 = \sum_{j=0}^{m-1} \sum_{i=0}^{n-1} |I(i, j) - T(i, j)| \qquad (1)$$

where the pixel value at the position of the coordinates (i,j) of the determination image region R1_L is represented by I(i,j) and the pixel value at the position of the coordinates (i,j) of the reference image region R1_R is represented by T(i,j).

The information on the matching value M1 obtained through the above operation is outputted to the corrected matching value acquisition unit 242.

The corrected matching value acquisition unit 242 acquires the corrected matching value M2 obtained through correcting the matching value M1 on the basis of the degree of variance Var. Specifically, the corrected matching value acquisition unit 242 performs an operation as below, to thereby obtain the corrected matching value M2:

$$M2=M1/Var$$

Then, the information on the corrected matching value M2 obtained through the above operation is outputted to the determination unit 243.

The determination unit 243 compares the corrected matching value M2 with the threshold value Th, to thereby determine whether or not the processing object region is an image region having high symmetry in the left and right direction (horizontal direction). Specifically, the determination unit 243 performs the following process.

(1) When M2<Th, the determination unit 243 outputs a determination result indicating that the processing object region is an image region having high symmetry in the left and right direction (horizontal direction) to the object region detection unit 25.

(2) When M2≥Th, the determination unit 243 outputs a determination result indicating that the processing object region is not an image region having high symmetry in the left and right direction (horizontal direction) to the object region detection unit 25.

The object region detection unit 25 determines whether or not the processing object region is an image region having high symmetry with respect to the symmetry axis on the basis of the determination result from the determination unit 243, and outputs the determination result. For example, the object region detection unit 25 outputs information on the image region having high symmetry with respect to the symmetry axis (coordinate position information, the size (area), the shape) or the like as data. Alternatively, the object region detection unit 25 outputs the determination result by outputting an image which clearly shows, in a distinguishable manner, the image region having high symmetry with respect to the symmetry axis, or the like.

Figure 5:
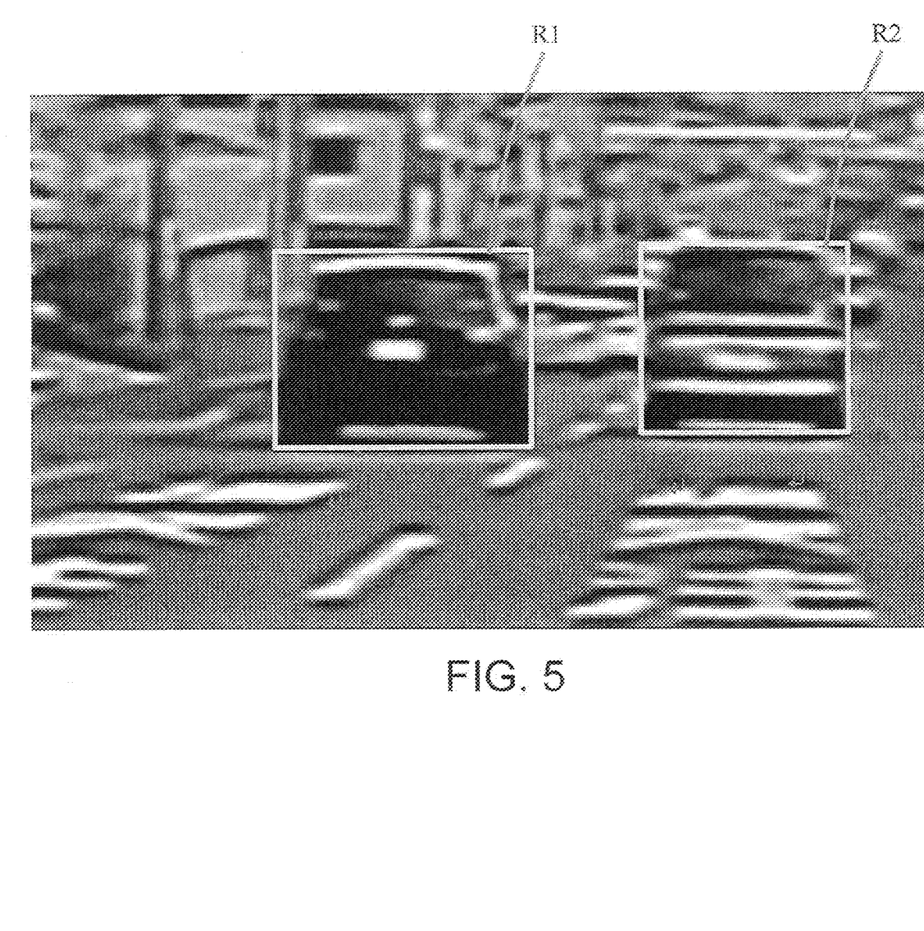
FIG. 5 is a view showing (an example of) an output result image of the object detection system 1000 in accordance with the first embodiment.

FIG. 5 shows (an example of) an output result image. FIG. 5 indicates that the regions R1 and R2, on which frames are each superimposed, are determined (extracted) as the image regions each including an object which has high bilateral symmetry.

Figure 6:
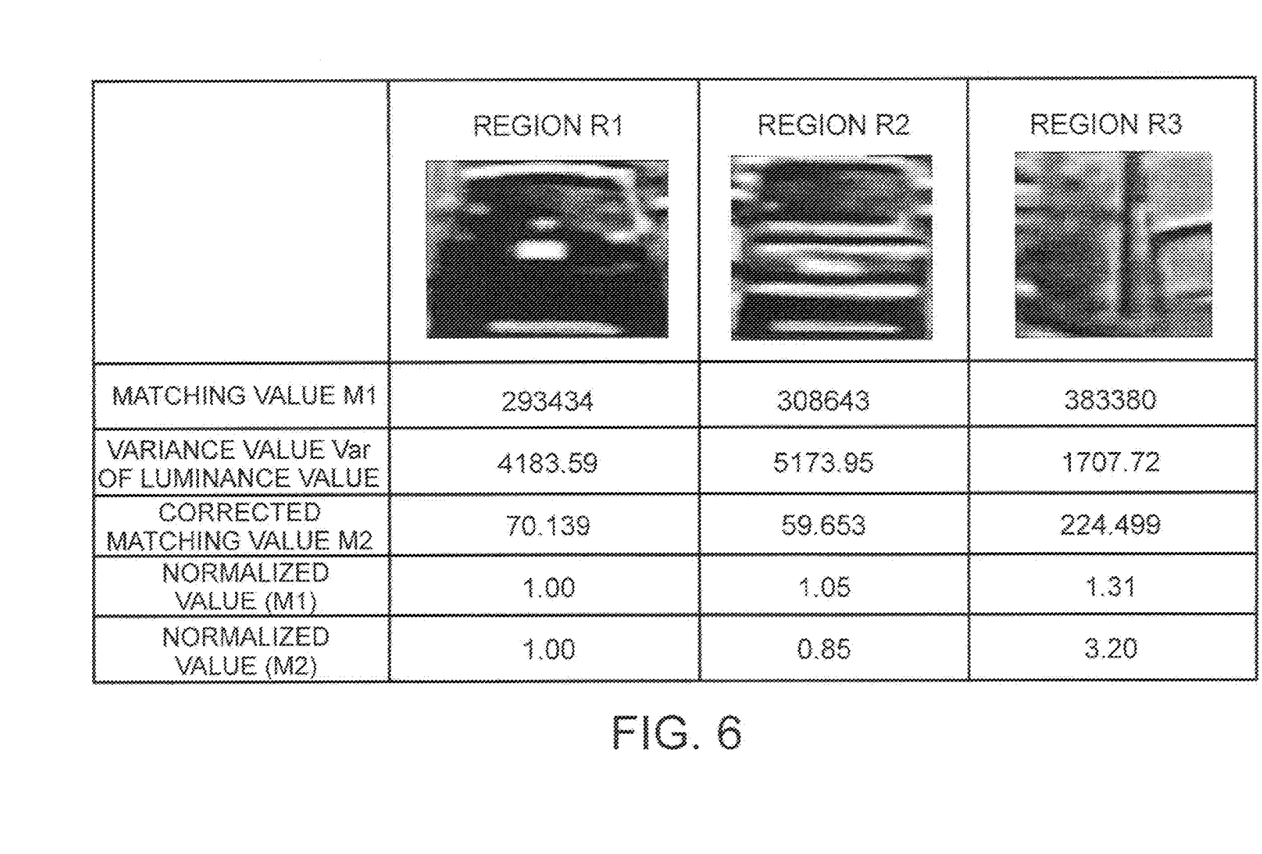
FIG. 6 is a view showing (an example of) a processing result of the object detection system 1000 in accordance with the first embodiment.

FIG. 6 shows a processing result obtained through performing the above processes with the regions R1 to R3 shown in FIG. 3 as the processing object regions in the object detection system 1000. Specifically, FIG. 6 shows (1) the matching value M1, (2) the variance value Var of the luminance value, (3) the corrected matching value M2, (4) assuming that the matching value M1 of the region R1 is "1", the ratio (normalized value) of the matching value M1 of other region to the matching value M1 of the region R1, and (5) assuming that the corrected matching value M2 of the region R1 is "1", the ratio (normalized value) of the corrected matching value M2 of other region to the corrected matching value M2 of the region R1, which are obtained through performing the above processes with the regions R1 to R3 as the processing object regions.

The pixel value of each pixel in the inputted image shown in FIG. 3 is 8-bit data, taking a value within a range from 0 to 255. Further, the variance value Var is a variance value of the pixel values (luminance values) in the entire processing object region.

As can be seen from FIG. 6, assuming that the matching value M1 of a region x is represented by M1(x), the ratio among the matching values M1 of the regions R1 to R3 is expressed as:

$$M1(R1):M1(R2):M1(R3)=1.00:1.05:1.31$$

then, $$(M1(R3)-M1(R2))/M1(R1)=0.26$$

When the matching value M1 is used for setting a threshold value (to be compared with the matching value M1) for determining whether or not the processing object region is an image region having high bilateral symmetry, the distributions of the matching values of a portion which is line symmetric and a portion which is not line symmetric are close. This makes it difficult to set an appropriate threshold value. Thus, it is difficult to appropriately determine that the regions R1 and R2 are image regions having high bilateral symmetry and the region R3 is an image region having low bilateral symmetry.

Conversely, as can be seen from FIG. 6, assuming that the corrected matching value M2 of a region x is represented by M2(x), the ratio among the corrected matching values M2 of the regions R1 to R3 is expressed as:

$$M2(R1):M2(R2):M2(R3)=1.00:0.85:3.20$$

then, $$(M2(R3)-M2(R1))/M2(R1)=2.20$$

When the corrected matching value M2 is used for setting a threshold value (to be compared with the corrected matching value M2) for determining whether or not the processing object region is an image region having high bilateral symmetry, the distributions of the matching values of a portion which is line symmetric and a portion which is not line symmetric are clearly separated (the normalized value in this case is about 8.5 times (≈2.20/0.26) that in the case of using the matching value M1). This enables an appropriate threshold value to be set easily. As a result, it becomes easy to appropriately determine that the regions R1 and R2 are image regions having high bilateral symmetry and the region R3 is an image region having low bilateral symmetry.

As discussed above, the object detection system 1000 determines, by using the corrected matching value M2, whether or not the processing object region is an image region having high bilateral symmetry. Accordingly, a setting range of the threshold value to be compared with the corrected matching value M2 is wide. Therefore, the object detection system 1000 can appropriately perform determination processing using the corrected matching value M2 simply by setting a single threshold value, for example, in the same image (a single image) or in the same scene. As a result, the object detection system 1000 makes it possible to appropriately specify (extract) an image region having high bilateral symmetry, without setting a plurality of threshold values or without any complicated grouping in accordance with cases.

Further, the region R1 is an image region showing a vehicle of dark color and the region R2 is an image region showing a vehicle of bright color, and the region R2 has bilateral symmetry higher than that of the region R1. When determination on the bilateral symmetry is performed by using the matching value M1, since M1 (R1)<M1(R2), it is wrongly determined that the region R1 has higher bilateral symmetry. As can be seen from FIGS. 3 and 6, there is a portion with high luminance in upper-right side of the vehicle in the region R1, and it can be determined that the bilateral symmetry of the region R1 is lower than that of the region R2. Further, since the matching value M1 is an integration result of differences in the absolute values of the pixel values of the pixels located at axially symmetric positions, a smaller matching value M1 indicates higher axial symmetry.

In contrast to this, when determination on the bilateral symmetry is performed by using the corrected matching value M2, since M2(R1)>M2(R2), it is appropriately determined that the region R2 has higher bilateral symmetry. Since the region R2 is a bright image region and has high contrast, the variance value Var(R2) of the luminance value is high. Conversely, since the region R1 is a dark image region and has low contrast, the variance value Var(R1) of the luminance value is low. Therefore, correcting the matching value M1 with the variance value Var makes it possible to acquire a value (corrected matching value M2) which appropriately reflects the degree of bilateral symmetry.

As described above, the object detection system 1000 obtains the corrected matching value M2 by correcting the matching value M1 with the degree of variance in the processing object region. The matching value M1 is obtained from two regions obtained through dividing the processing object region by the symmetry axis, i.e., the determination image region and the reference image region, The object detection system 1000 performs the determination process by using the corrected matching value M2 which is obtained by appropriately correcting the variance of the property of the image region, and thus the distributions of the matching values of a portion which is line symmetric and a portion which is not line symmetric are separated more clearly as compared with the conventional cases. This makes it easier to set a threshold value.

Therefore, the object detection system 1000 can appropriately detect an axially symmetric object in an image, whatever image is to be processed, without performing any complicated thresholding.

<<The First Modification>>

Next, a first modification of the first embodiment will be described.

Figure 7:
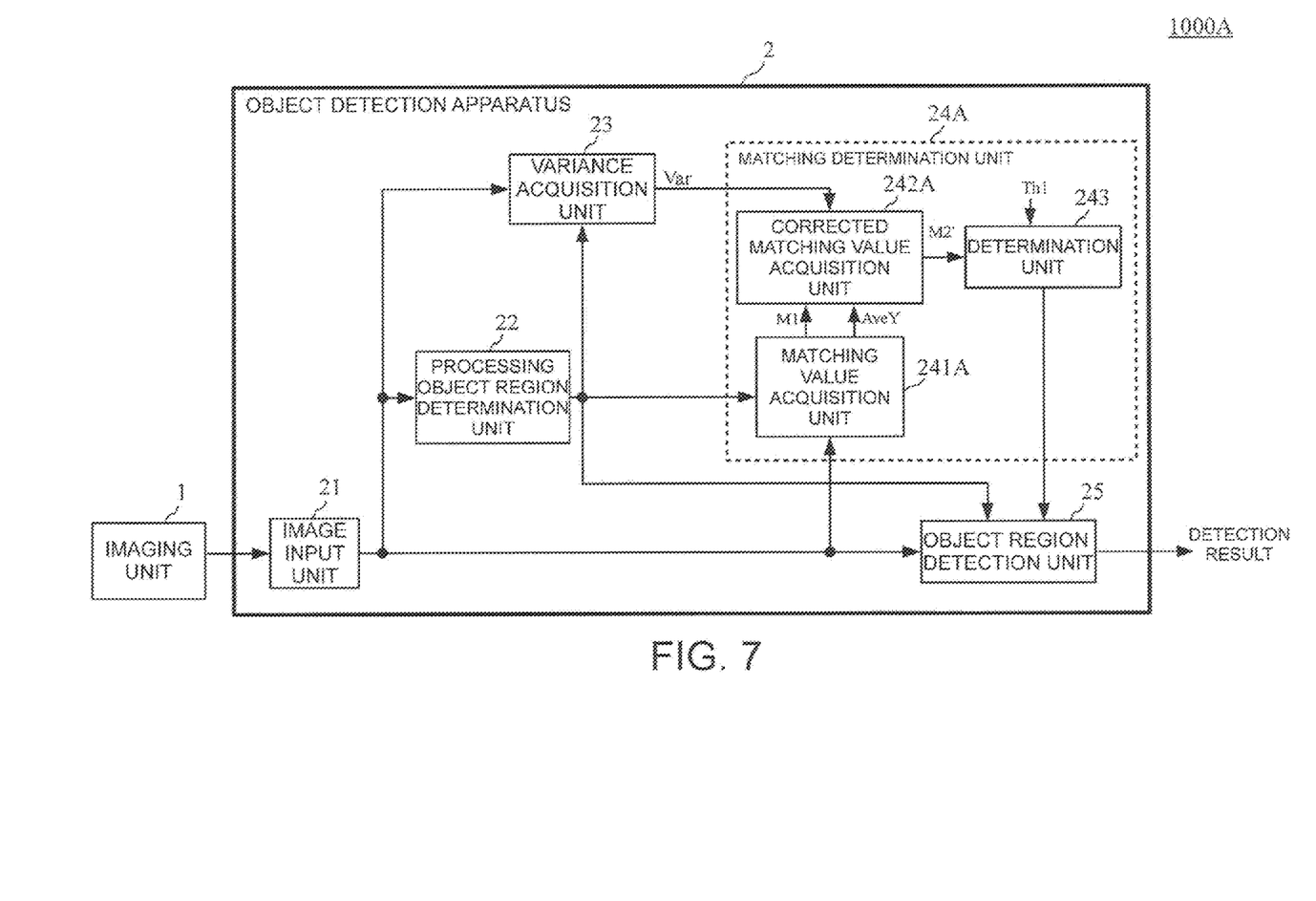
FIG. 7 is a block diagram showing an overall constitution of an object detection system 1000A in accordance with a first modification of the first embodiment.

FIG. 7 is a block diagram showing an overall constitution of an object detection system 1000A in accordance with the present modification, As shown in FIG. 7, the object detection system 1000A of the present modification has a constitution in which the matching determination unit 24 is replaced with a matching determination unit 24A in the object detection system 1000 of the first embodiment.

The matching determination unit 24A has a constitution in which the matching value acquisition unit 241 is replaced with a matching value acquisition unit 241A and the corrected matching value acquisition unit 242 is replaced with a corrected matching value acquisition unit 242A in the matching determination unit 24.

Other than the above constituent elements, the object detection system 1000A of the present modification has the same constitution as that of the object detection system 1000 of the first embodiment.

Hereinafter, discussion will be made on characteristic features peculiar to the present modification.

The matching value acquisition unit 241A receives the luminance image outputted from the image input unit 21 and the information on the processing object region and the symmetry axis outputted from the processing object region determination unit 22. The matching value acquisition unit 241A acquires the matching value M1 between the determination image region which is one image region obtained through dividing the processing object region by the symmetry axis and the reference image region which is the other image region obtained through dividing the processing object region by the symmetry axis. The matching value acquisition unit 241A further acquires an average value of the luminance values in the entire processing object region or an average value of the luminance values in one image region obtained by dividing the processing object region by the symmetry axis, as an average luminance value AveY.

Then, the matching value acquisition unit 241A outputs information on the acquired matching value M1 and average luminance value AveY to the corrected matching value acquisition unit 242A.

The corrected matching value acquisition unit 242A receives the information on the degree of variance Var outputted from the variance acquisition unit 23 and the information on the matching value M1 and the average luminance value AveY outputted from the matching value acquisition unit 241A. The corrected matching value acquisition unit 242A corrects the matching value M1 on the basis of the degree of variance Var and the average luminance value AveY, to thereby acquire a corrected matching value M2'. For example, the corrected matching value acquisition unit 242A performs an operation as below, to thereby obtain the corrected matching value M2':

$$M2'=M1/(Var \times AveY)$$

Then, the corrected matching value acquisition unit 242A outputs information on the acquired corrected matching value M2' to the determination unit 243.

The determination unit 243 compares the corrected matching value M2' with a threshold value Th', to thereby determine whether or not the processing object region is an image region having high axial symmetry.

Thus, the object detection system 1000A of the present modification obtains the corrected matching value M2' by correcting the matching value M1 with degree of variance Var and the average luminance value AveY in the processing object region. The matching value M1 is obtained from two regions obtained by dividing the processing object region by the symmetry axis, i.e., the determination image region and the reference image region. Specifically, the object detection system 1000A of the present modification, corrects the matching value M1 also with the average luminance value AveY in the processing object region, and thus it is possible to obtain the corrected matching value M2' with the effect of brightness (luminance) in the processing object region eliminated. In other words, the object detection system 1000A performs the determination process by using the corrected matching value M2' which is appropriately corrected in consideration of the variance of the property of the image region and the brightness (average luminance value) in the processing object region. This significantly broadens the setting range of the threshold value to be used in thresholding as compared with the conventional cases, thus making it easier to set a threshold value.

Therefore, in the object detection system 1000A, it is possible to appropriately detect an axially symmetric object in an image, whatever image is to be processed, without performing any complicated thresholding.

Other Embodiments

By combining part of or the whole of the above-discussed embodiment and modification, an object detection system may be configured.

Though the exemplary case has been discussed where the matching value M1 is calculated by using a SAD (Sum of Absolute Differences) value in the above-discussed embodiment, calculation of the matching value M1 is not limited to this method, but the matching value M1 may be calculated by using, for example, a SSD (Sum of Square Differences) value.

Further, though the case has been discussed where an object (image region) having high symmetry in the left and right direction (horizontal direction) which is included in the inputted image is detected, in other words, the direction of the symmetry axis is vertical in the above-discussed embodiment, the direction of the symmetry axis is not limited to this, but may be any direction. In a case where the direction of symmetry axis is any direction, before the processing discussed in the above embodiment is performed, as a preprocessing, the processing object region may be rotated so that the direction of the symmetry axis may be vertical. Performing such a preprocessing allows the direction of the symmetry axis to be vertical and then, performing the same processing as that in the above-discussed embodiment (the processing for determining the symmetry in the horizontal direction) allows an object (image region) having high symmetry with respect to a symmetry axis in any direction to be specified (extracted) in an appropriate manner.

Furthermore, though the processing object region has a rectangular shape in the above-discussed embodiment, the shape of the processing object region is not limited to this, but the processing object region may have any other shape (for example, circle, ellipse, or the like) as long as the shape is substantially line symmetric with respect to the symmetry axis.

Though the variance value of the pixel values (luminance values) is used as the degree of variance Var in the above-discussed embodiment, the degree of variance is not limited to this, but, for example, a standard deviation value of the pixel values (luminance values) may be used as the degree of variance Var to perform the processing.

Further, part of or the whole of the object detection system and the object detection apparatus of the above-discussed embodiment may be implemented as an integrated circuit (for example, an LSI, a system LSI, or the like).

Part of or the whole of the operations of the functional blocks of the above-discussed embodiment may be implemented by using a program. Then, part of or the whole of the operations of the functional blocks of the above-discussed embodiment are executed by a CPU in a computer. Further, the program used to perform the operations is stored in a memory device such as a hard disk, a ROM, or the like and executed from the ROM or read out to the RAM and then executed.

The processings in the above-discussed embodiment may be performed by hardware, or may be performed by software (OS (Operating System), middleware, or implemented with a predetermined library). Further, the processings may be implemented by a mixed processing of software and hardware. In a case where the object detection system and the object detection apparatus in the above-discussed embodiment are implemented by hardware, it goes without saying that it is necessary to perform timing adjustment for performing the processings. In the above-discussed embodiment, for convenience of discussion, the detail of timing adjustment of various signals in an actual hardware design is omitted.

The order of execution of the processings in the above-discussed embodiment is not necessarily limited to that discussed in the above-discussed embodiment, but may be changed without departing from the spirit of the invention.

A computer program which causes a computer to perform the above-discussed method and a computer-readable recording medium in which the program is stored are included in the scope of the present invention. Herein, examples of the computer-readable recording medium include a flexible disk, a hard disk, a CD-ROM, a MO, a DVD, a DVD-ROM, a DVD-RAM, a large-capacity DVD, a next-generation DVD, or a semiconductor memory.

The above-discussed computer program is not limited to be recorded in the above-discussed recording medium, but may be transmitted via a telecommunications line, a wireless or wired communication line, a network such as the internet.

Further, the specific constitution of the present invention is not limited to the above-discussed embodiment, but various changes and modifications may be made without departing from the spirit of the invention.

APPENDIXES

The present invention may be expressed as follows.

A first aspect of the present invention provides an object detection apparatus including a processing object region determination unit, a variance acquisition unit, a matching determination unit, and an object region detection unit.

The processing object region determination unit sets a symmetry axis in an image region included in an image and divides the image region into a determination image region and a reference image region so as to be line symmetric with respect to the symmetry axis.

The variance acquisition unit acquires a degree of variance of image feature amount in the image region.

The matching determination unit acquires a matching value between the determination image region and the reference image region and determines the symmetry between the determination image region and the reference image region with respect to the symmetry axis on the basis of a corrected matching value obtained by correcting the acquired matching value in accordance with the degree of variance.

The object region detection unit detects an image region which is line symmetric with respect to the symmetry axis on the basis of a determination result obtained by the matching determination unit.

The object detection apparatus obtains the corrected matching value, by correcting the matching value, which is obtained from two regions obtained through dividing the processing object region by the symmetry axis, i.e., the determination image region and the reference image region, with the degree of variance in the processing object region. The object detection apparatus performs the determination process by using the corrected matching value which is obtained by appropriately correcting the variance of the property of the image region, and thus the distributions of the matching values of a portion which is line symmetric and a portion which is not line symmetric are separated more clearly as compared with the conventional cases. This makes it easier to set a threshold value.

Therefore, the object detection apparatus can appropriately detect an axially symmetric object in an image, whatever image is to be processed, without performing any complicated thresholding.

Further, the "image feature amount" refers to a physical quantity depending on the property of the image, and is a concept including, for example, a pixel value of a pixel which is a constituent element of an image, a luminance value, a specific color component value (e.g., R component value, G component value, B component value, Y component value, Cr component value, Cr component value, or the like).

A second aspect of the present invention provides the object detection apparatus of the first aspect of the present invention in which the degree of variance is a variance value or a standard deviation of the image region.

Thus, the degree of variance can be determined by using the variance value or the standard deviation value of the image region (processing object region).

A third aspect of the present invention provides the object detection apparatus of the first aspect of the present invention in which the degree of variance is a variance value or a standard deviation of either one of the determination image region and the reference image region.

Thus, the degree of variance can be determined by using the variance value or the standard deviation value of either one of the determination image region and the reference image region.

A fourth aspect of the present invention provides the object detection apparatus of any one of the first to third aspects of the present invention in which the image feature amount is a luminance value.

Thus, the degree of variance in the image region (processing object region) can be determined by using the luminance value.

A fifth aspect of the present invention provides the object detection apparatus of of any one of the first to fourth aspects of the present invention in which the matching determination unit determines a degree of matching between the determination image region and the reference image region on the basis of the degree of variance and a matching value M1 obtained from:

$$M1 = \sum_{j=0}^{m-1}\sum_{i=0}^{n-1} |I(i, j) - T(i, j)| \qquad (2)$$

where the determination image region and the reference image region each consist of n pixels×m pixels (m, n: natural number), and pixel values of pixels positioned line-symmetrically with respect to the symmetry axis in the determination image region and the reference image region are represented by I(i,j) and T(i,j), respectively.

Thus, the object detection apparatus can obtain the matching value M1 by using a SAD value.

A sixth aspect of the present invention provides the object detection apparatus of of any one of the first to fourth aspects of the present invention in which the matching determination unit determines a degree of matching between the determination image region and the reference image region on the basis of the degree of variance and a matching value M1 obtained from:

$$M1 = \sum_{j=0}^{m-1}\sum_{i=0}^{n-1} (I(i, j) - T(i, j))^2 \qquad (3)$$

where the determination image region and the reference image region each consist of n pixels×m pixels (m, n: natural number), and pixel values of pixels positioned line-symmetrically with respect to the symmetry axis in the determination image region and the reference image region are represented by I(i,j) and T(i,j), respectively.

Thus, the object detection apparatus can obtain the matching value M1 by using a SSD value.

A seventh aspect of the present invention provides the object detection apparatus of the fifth or sixth aspect of the present invention in which the matching determination unit determines the degree of matching between the determination image region and the reference image region on the basis of a corrected matching value M2 obtained from:

$$M2=M1/\text{Var}$$

where the degree of variance is represented by Var.

Thus, the object detection apparatus can determine the degree of matching between the determination image region and the reference image region by using the corrected matching value M2 obtained by dividing the matching value M1 by the degree of variance Var.

An eighth aspect of the present invention provides the object detection apparatus of the fifth or sixth aspect of the present invention in which the matching determination unit determines the degree of matching between the determination image region and the reference image region on the basis of a corrected matching value M2 obtained from:

$$M2=M1/(\text{Var}\times\text{AveY})$$

where the degree of variance is represented by Var and an average value of luminance in the image region is represented by AveY.

Thus, the object detection apparatus can determine the degree of matching between the determination image region and the reference image region by using the corrected matching value M2 obtained through dividing the matching value M1 by the degree of variance Var and the average luminance value of the image region (processing object region).

A ninth aspect of the present invention provides the object detection apparatus of the fifth or sixth aspect of the present invention in which the matching determination unit determines the degree of matching between the determination image region and the reference image region on the basis of a corrected matching value M2 obtained from:

$$M2=M1/(\text{Var}\times\text{AveY})$$

where the degree of variance is represented by Var and an average value of luminance in either one of the determination image region and the reference image region is represented by AveY.

Thus, the object detection apparatus can determine the degree of matching between the determination image region and the reference image region by using the corrected matching value M2 obtained through dividing the matching value M1 by the degree of variance Var and the average luminance value of either one of the determination image region and the reference image region.

A tenth aspect of the present invention provides a non-transitory computer readable storage medium storing a program causing a computer to perform an object detection method including a processing object region determination step, a variance acquisition step, a matching determination step, and an object region detection step.

The processing object region determination step is executed to set a symmetry axis in an image region included in an image and divide the image region into a determination image region and a reference image region so as to be line symmetric with respect to the symmetry axis.

The variance acquisition step is executed to acquire a degree of variance of image feature amount in the image region. The matching determination step is executed to acquire a matching value between the determination image region and the reference image region and determine the symmetry between the determination image region and the reference image region with respect to the symmetry axis on the basis of a corrected matching value obtained by correcting the acquired matching value in accordance with the degree of variance.

The object region detection step is executed to detect an image region which is line symmetric with respect to the symmetry axis on the basis of a determination result obtained by the matching determination step.

Accordingly, it is possible to achieve a program which produces the same effect as that of the first aspect of the present invention.

An eleventh aspect of the present invention provides an integrated circuit including a processing object region determination unit, a variance acquisition unit, a matching determination unit, and an object region detection unit.

The processing object region determination unit sets a symmetry axis in an image region included in an image and divides the image region into a determination image region and a reference image region so as to be line symmetric with respect to the symmetry axis.

The variance acquisition unit acquires a degree of variance of image feature amount in the image region.

The matching determination unit acquires a matching value between the determination image region and the reference image region and determines the symmetry between the determination image region and the reference image region with respect to the symmetry axis on the basis of a corrected matching value obtained by correcting the acquired matching value in accordance with the degree of variance.

The object region detection unit detects an image region which is line symmetric with respect to the symmetry axis on the basis of a determination result obtained by the matching determination unit.

Accordingly, it is possible to achieve an integrated circuit which produces the same effect as that of the first aspect of the present invention.

What is claimed is:

1. An object detection method, comprising:
   (a) setting a symmetry axis in an image region included in an image and dividing said image region into a determination image region and a reference image region so as to be line symmetric with respect to said symmetry axis;
   (b) acquiring, by a processor, a degree of variance of image feature amount in said image region;
   (c) acquiring, by a processor, a matching value between said determination image region and said reference image region and determine the symmetry between said determination image region and said reference image region with respect to said symmetry axis on the basis of a corrected matching value obtained by correcting said acquired matching value in accordance with said degree of variance; and
   (d) detecting an image region which is line symmetric with respect to said symmetry axis on the basis of a determination result obtained in step (c).

2. The object detection method according to claim 1, wherein
   said degree of variance is a variance value or a standard deviation of said image region.

3. The object detection method according to claim 1, wherein
   said degree of variance is a variance value or a standard deviation of either one of said determination image region and said reference image region.

4. The object detection method according to claim 1, wherein
   said image feature amount is a luminance value.

5. The object detection method according to claim 1, wherein
   step (c) includes determining a degree of matching between said determination image region and said reference image region on the basis of said degree of variance and a matching value M1 obtained from:

$$M1 = \sum_{j=0}^{m-1} \sum_{i=0}^{n-1} |I(i, j) - T(i, j)| \qquad \text{(cl 5)}$$

where said determination image region and said reference image region each consist of n pixels×m pixels (m, n: natural number), and pixel values of pixels positioned line-symmetrically with respect to said symmetry axis in said determination image region and said reference image region are represented by I(i, j) and T(i, j), respectively.

6. The object detection method according to claim 1, wherein
   step (c) includes determining a degree of matching between said determination image region and said reference image region on the basis of said degree of variance and a matching value M1 obtained from:

$$M1 = \sum_{j=0}^{m-1} \sum_{i=0}^{n-1} (I(i, j) - T(i, j))^2 \qquad \text{(cl 6)}$$

where said determination image region and said reference image region each consist of n pixels×m pixels (m, n: natural number), and pixel values of pixels positioned line-symmetrically with respect to said symmetry axis in said determination image region and said reference image region are represented by I(i, j) and T(i, j), respectively.

7. The object detection method according to claim 5, wherein
   step (c) includes determining said degree of matching between said determination image region and said reference image region on the basis of a corrected matching value M2 obtained from:

$M2=M1/\text{Var}$ where said degree of variance is represented by Var.

8. The object detection method according to claim 5, wherein
   step (c) includes determining said degree of matching between said determination image region and said reference image region on the basis of a corrected matching value M2 obtained from:

$M2=M1/(\text{Var}\times\text{AveY})$ where said degree of variance is represented by Var and an average value of luminance in said image region is represented by AveY.

9. The object detection method according to claim 5, wherein
   step (c) includes determining said degree of matching between said determination image region and said reference image region on the basis of a corrected matching value M2 obtained from:

$M2=M1/(\text{Var}\times\text{AveY})$ where said degree of variance is represented by Var and an average value of luminance in either one of said determination image region and said reference image region is represented by AveY.

10. A non-transitory computer readable storage medium storing a program causing a computer to perform an object detection method comprising:
   setting a symmetry axis in an image region included in an image and dividing said image region into a determination image region and a reference image region so as to be line symmetric with respect to said symmetry axis;
   acquiring a degree of variance of image feature amount in said image region;
   acquiring a matching value between said determination image region and said reference image region and determining the symmetry between said determination image region and said reference image region with respect to said symmetry axis on the basis of a corrected matching value obtained by correcting said acquired matching value in accordance with said degree of variance; and detecting an image region which is line symmetric with respect to said symmetry axis on the basis of a determination result obtained by said step of determining the symmetry.

11. An integrated circuit, comprising:

a processing object region determination unit configured to set a symmetry axis in an image region included in an image and divide said image region into a determination image region and a reference image region so as to be line symmetric with respect to said symmetry axis;

a variance acquisition unit configured to acquire a degree of variance of image feature amount in said image region;

a matching determination unit configured to acquire a matching value between said determination image region and said reference image region and determine the symmetry between said determination image region and said reference image region with respect to said symmetry axis on the basis of a corrected matching value obtained by correcting said acquired matching value in accordance with said degree of variance;

an object region detection unit configured to detect an image region which is line symmetric with respect to said symmetry axis on the basis of a determination result obtained by said matching determination unit; and a processor configured to control at least one of the processing object region determination unit, the variance acquisition unit, the matching determination unit, and the object region detection unit.

12. An object detection apparatus comprising:

a processing object region determination unit configured to set a symmetry axis in an image region included in an image and divide said image region into a determination image region and a reference image region so as to be line symmetric with respect to said symmetry axis;

a variance acquisition unit configured to acquire a degree of variance of image feature amount in said image region;

a matching determination unit configured to acquire a matching value between said determination image region and said reference image region and determine the symmetry between said determination image region and said reference image region with respect to said symmetry axis on the basis of a corrected matching value obtained by correcting said acquired matching value in accordance with said degree of variance;

an object region detection unit configured to detect an image region which is line symmetric with respect to said symmetry axis on the basis of a determination result obtained by said matching determination unit; and a processor configured to control at least one of the processing object region determination unit, the variance acquisition unit, the matching determination unit, and the object region detection unit.

* * * * *